US011923783B2

United States Patent
Jha et al.

(10) Patent No.: US 11,923,783 B2
(45) Date of Patent: Mar. 5, 2024

(54) SYSTEM AND METHOD FOR DETECTION OF SWITCHING DEVICE FAILURE CONDITIONS IN A MULTI-LEVEL POWER CONVERTER

(71) Applicant: General Electric Renovables Espana, S.L., Barcelona (ES)

(72) Inventors: Kapil Jha, Bangalore (IN); Fernando Arturo Ramirez Sanchez, Salem, VA (US); Nathaniel Robert Michener, Roanoke, VA (US); Arvind Kumar Tiwari, Niskayuna, NY (US); Robert Gregory Wagoner, Roanoke, VA (US); Joseph Kiran Banda, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 72 days.

(21) Appl. No.: 17/534,507

(22) Filed: Nov. 24, 2021

(65) Prior Publication Data

US 2023/0163695 A1 May 25, 2023

(51) Int. Cl.
*H02M 7/487* (2007.01)
*H02M 1/32* (2007.01)

(52) U.S. Cl.
CPC ............ *H02M 7/487* (2013.01); *H02M 1/32* (2013.01)

(58) Field of Classification Search
CPC .................................. H02M 7/487; H02M 1/32
See application file for complete search history.

(56) References Cited

U.S. PATENT DOCUMENTS 8,207,736 B2   6/2012   Chu et al.
8,471,584 B2   6/2013   Soldi et al.
(Continued)

FOREIGN PATENT DOCUMENTS

CN   103378759 B   4/2017
EP   2393198 A2   12/2011

OTHER PUBLICATIONS

Fazio et al., Fault Detection and Reconfiguration Strategy for ANPC Converters, 2012 15th International Power Electronics and Motion Control Conference (EPE/PEMC) Sep. 4-6, 2012, IEEE, Novi Sad, Serbia. Abstract Only.
(Continued)

*Primary Examiner* — Rafael O De Leon Domenech
(74) *Attorney, Agent, or Firm* — Dority & Manning, P.A.

(57) ABSTRACT

A method for operating a multi-level bridge power converter includes arranging a plurality of switching devices including at least four inner switching devices and at least two outer switching devices in an active neutral point clamped topology. The method also includes determining whether any of the switching devices is experiencing a failure condition by implementing a failure detection algorithm. The failure detection algorithm includes generating a blocking state logic signal by comparing a switching device voltage and a threshold reference voltage for each of the switching devices, determining an expected voltage blocking state for each of the switching devices based on gate drive signals of the switching devices and an output current direction, and detecting whether a failure condition is present in any of the switching devices based on the blocking state logic signals and the expected voltage blocking states of the switching devices.

17 Claims, 8 Drawing Sheets

(56) References Cited

U.S. PATENT DOCUMENTS

| | | | |
|---|---|---|---|
| 8,472,153 | B1 | 6/2013 | Grbovic |
| 10,063,161 | B2 | 8/2018 | Li et al. |
| 10,355,618 | B2 | 7/2019 | Zhuang et al. |
| 2007/0159749 | A1 | 7/2007 | Oka |
| 2011/0140727 | A1* | 6/2011 | Soldi ............... H03K 17/18 |
| | | | 324/762.01 |
| 2016/0352251 | A1 | 12/2016 | Li et al. |
| 2018/0109201 | A1* | 4/2018 | Li ..................... F03D 17/00 |

OTHER PUBLICATIONS

EP Search Report for EP application No. 22205840.6, dated Mar. 29, 2023, 9 pages.

Francois, B. et al., Design of a Fault Tolerant Control System for a N.P.C. Multilevel Inverter, Industrial Electronics 2002, ISIE 2002, Proceedings of the 2002 IEEE International Symposium Jul. 8, 2002, Piscataway NJ, USA, IEEE vol. 4, pp. 1075-1080.

\* cited by examiner

SYSTEM AND METHOD FOR DETECTION OF SWITCHING DEVICE FAILURE CONDITIONS IN A MULTI-LEVEL POWER CONVERTER

FIELD

The present disclosure relates generally to electrical power systems, and more particularly to a system and method for detection of switching device failure conditions in a multi-level power converter in an electrical power system.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly-fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Multi-level converters (such as neutral point clamped converters) are generally used in high power industrial applications such as variable speed drive (VSD) systems or in energy conversion applications such as a solar (or photovoltaic) power generation systems, wind turbine generators or marine and hydrokinetic power generation systems. The general function of the multi-level converter is to synthesize a sinusoidal voltage by several levels of voltages, typically obtained from capacitor voltage sources. A three level converter includes two capacitor voltages in series with the center tap as the neutral. Each phase leg of the three-level converter has two pairs of switching devices in series. The switching device is bidirectional in current, often realized as anti-parallel connection of a unidirectional electronic switching device (e.g., IGBT, IGCT) and a diode (freewheeling diode).

The switching devices in a multi-level converter receive high electrical and thermal stress during short-circuit conditions or during turn-off switching of a clamped inductive load. For example, if there is large power loss within the switching device due to electrical stress or overcurrent, the switching device overheats and it may lead to thermal breakdown of the switching device. Similarly, when an inductive load or inductive current is switched off, the switching device may observe overvoltage resulting into voltage breakdown of the switching device. Once a switching device is broken down or destroyed due to overheat or overvoltage, without protective measures, a chain reaction may occur resulting into destruction of the entire multi-level converter bridge.

Thus, it is important to detect failures in switching devices in multi-level converters. One example of a measurement used for detecting switching device failure in IGBT converters is a desaturation circuit. However, methods using the desaturation circuit detect a failure condition only when the corresponding switching device is turned ON and do not provide any signal when the gate drive signal to the switching device is turned OFF. Thus, the desaturation circuit does not detect all possible short-circuit failure conditions.

Accordingly, it is desirable to provide an improved system and method for detection of switching device failure conditions in a multi-level power converter in an electrical power system that addresses the foregoing issues.

BRIEF DESCRIPTION

Aspects and advantages of the disclosure will be set forth in part in the following description, or may be obvious from the description, or may be learned through practice of the disclosure.

In one aspect, the present disclosure is directed to a computer-implemented method for operating a multi-level bridge power converter of an electrical power system connected to a power grid. The power converter includes a first converter and a second converter coupled via a DC link. The method includes arranging a plurality of switching devices having at least four inner switching devices and at least two outer switching devices in an active neutral point clamped topology. The method also includes determining whether any of the plurality of switching devices is experiencing a failure condition by implementing a failure detection algorithm. The failure detection algorithm includes generating a blocking state logic signal by comparing a switching device voltage and a threshold reference voltage for each of the plurality of switching devices, determining an expected voltage blocking state for each of the plurality of switching devices based on gate drive signals of the plurality of switching devices and an output current direction, and detecting whether a failure condition is present in any of the plurality of switching devices based on the blocking state logic signals and the expected voltage blocking states of the plurality of switching devices.

In an embodiment, the plurality of switching devices may be a plurality of insulated gate bipolar transistors (IGBTs). Thus, in such embodiments, the plurality of IGBTs may include a first IGBT, a second IGBT, a third IGBT, a fourth IGBT, a fifth IGBT, and a sixth IGBT, whereas the second IGBT, the third IGBT, the fifth IGBT, and the sixth IGBT are the four inner switching devices and the first IGBT and the fourth IGBT are the two outer switching devices.

In another embodiment, determining the expected voltage blocking state for each of the plurality of switching devices based on the gate drive signals of the plurality of switching devices and the output current direction further comprises determining the expected output voltage at output terminals of the multi-level bridge power converter.

In further embodiments, the expected output voltage is a zero voltage when the gate drive signals for the first IGBT, the third IGBT, and the fourth IGBT are low, the gate drive signal of the second IGBT is high, the output current direction is negative, and the gate drive signals for the fifth IGBT and the sixth IGBT are high or when the gate drive signals for the first IGBT, the second IGBT, and the fourth IGBT are low, the gate drive signal of the third IGBT is high, the output current direction is positive, and the gate drive signals for the fifth IGBT and the sixth IGBT are high or when the gate drive signals for the second IGBT or the third IGBT are high and the gate drive signals for both the first IGBT and the fourth IGBT are low.

In additional embodiment, the expected output voltage is a positive voltage when the gate drive signals for the first IGBT, the third IGBT, and the fourth IGBT are low, the gate drive signal for the second IGBT is high the output current direction is negative, and the gate drive signals for the fifth IGBT or the sixth IGBT are low or when the gate drive signals for both the first IGBT and the second IGBT are high or when the output current direction is negative and the gate drive signals for the first IGBT, the second IGBT, the third IGBT, and the fourth IGBT are low.

In several embodiments, the expected output voltage is a negative voltage when the gate drive signals for the first IGBT, the second IGBT, and the fourth IGBT are low, the gate drive signal of the third IGBT is high, the output current direction is positive, and the gate drive signals for the fifth IGBT or the sixth IGBT are low or when the gate drive signals for both the third IGBT and the fourth IGBT are high or when the output current direction is positive and the gate drive signals for the first IGBT, the second IGBT, the third IGBT, and the fourth IGBT are low.

In additional embodiments, the failure detection algorithm detects the failure condition in the first IGBT when the expected output voltage is not positive and the blocking state logic signal for the first IGBT is low.

In another embodiment, the failure detection algorithm detects the failure condition in the second IGBT when the expected output voltage is negative and the blocking state logic signal for the second IGBT is low.

In further embodiments, the failure detection algorithm detects the failure condition in the third IGBT when the expected output voltage is positive and the blocking state logic signal for the third IGBT is low.

In an embodiments, the failure detection algorithm detects the failure condition in the fourth IGBT when the expected output voltage is positive and the blocking state logic signal for the fourth IGBT is low.

In yet another embodiment, the failure detection algorithm detects the failure condition in the fifth IGBT when the expected output voltage is positive and the blocking state logic signal for the fifth IGBT is low.

In still further embodiments, the failure detection algorithm detects the failure condition in the sixth IGBT when the expected output voltage is negative and the blocking state logic signal for the sixth IGBT is low.

In another aspect, the present disclosure is directed to a multi-level bridge power converter. The multi-level bridge power converter a plurality of phase legs each including a plurality of switching devices. The plurality of switching devices includes at least four inner switching devices and at least two outer switching devices arranged in an active neutral point clamped topology. The multi-level bridge power converter further includes a switching device failure detection circuit. The switching device failure detection circuit includes a logic module for each of the plurality of switching devices to generate a blocking state logic signal by comparing a switching device voltage of each of the plurality of switching devices and a threshold reference voltage, a voltage calculation module to determine an expected voltage blocking state for each of the plurality of switching devices based on gate drive signals of the plurality of switching devices and an output current direction, and a failure detection algorithm to detect a failure condition in any of the plurality of switching devices based on the blocking state logic signals and the expected voltage blocking states of the plurality of switching devices. It should be understood that the multi-level bridge power converter may further include any of the additional steps and/or features described herein.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
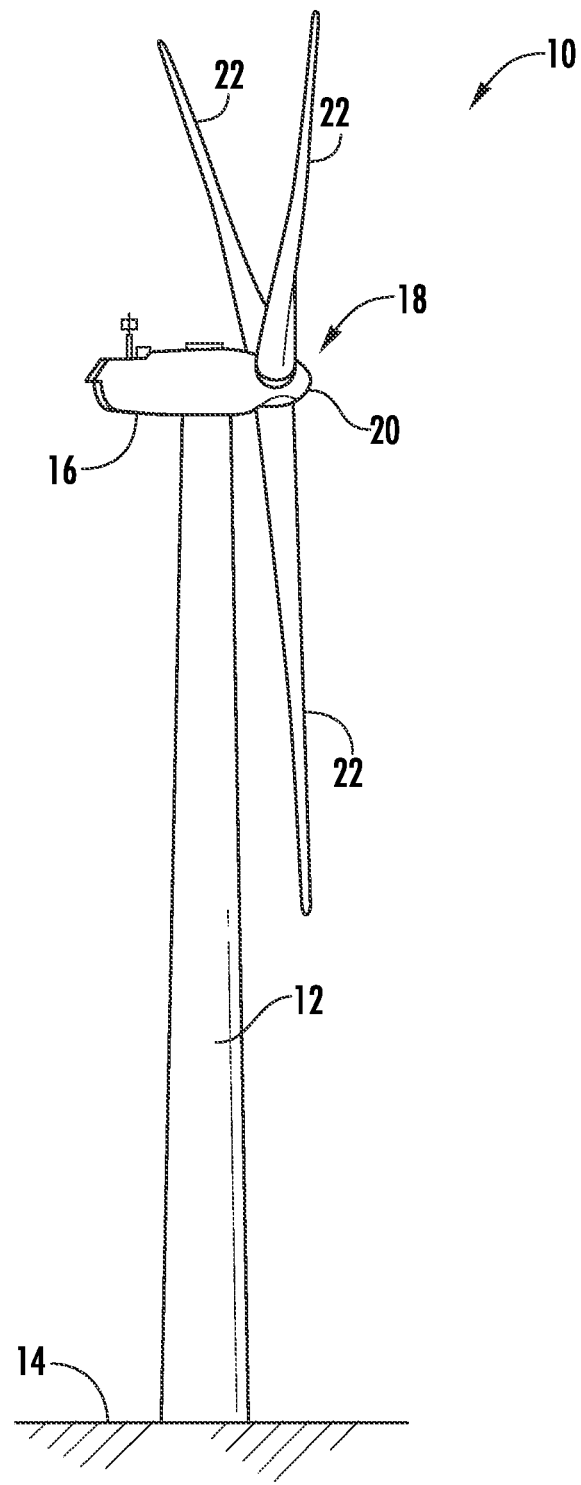
FIG. 1 illustrates a perspective view of one embodiment of a wind turbine according to the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Three-level neutral point clamped (NPC) converters must take less voltage stress because of the series connection arrangement compared to two-level converters. However, due to large commutation loops, inner switching devices of the power converter experience higher voltage spikes and demands to have lossy snubbers in place. To avoid snubbers, active neutral point clamped (ANPC) converters with active clamped switches offers shorter commutation loops compared to NPC. Further, double dead time PWM techniques applied to ANPC offers lesser voltage stress on the inner switching devices. In line with ANPC converters, it is important to detect device failure quickly and assign a failure response mode instantly to protect the DC link and avoid chain reaction failure on other devices. Thus, the present disclosure is directed to a system and method for controlling a multi-level power converter that detects any semiconductor failure conditions in the ANPC converter.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 10. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 24 (FIG. 2) to permit electrical energy to be produced.

Figure 2:
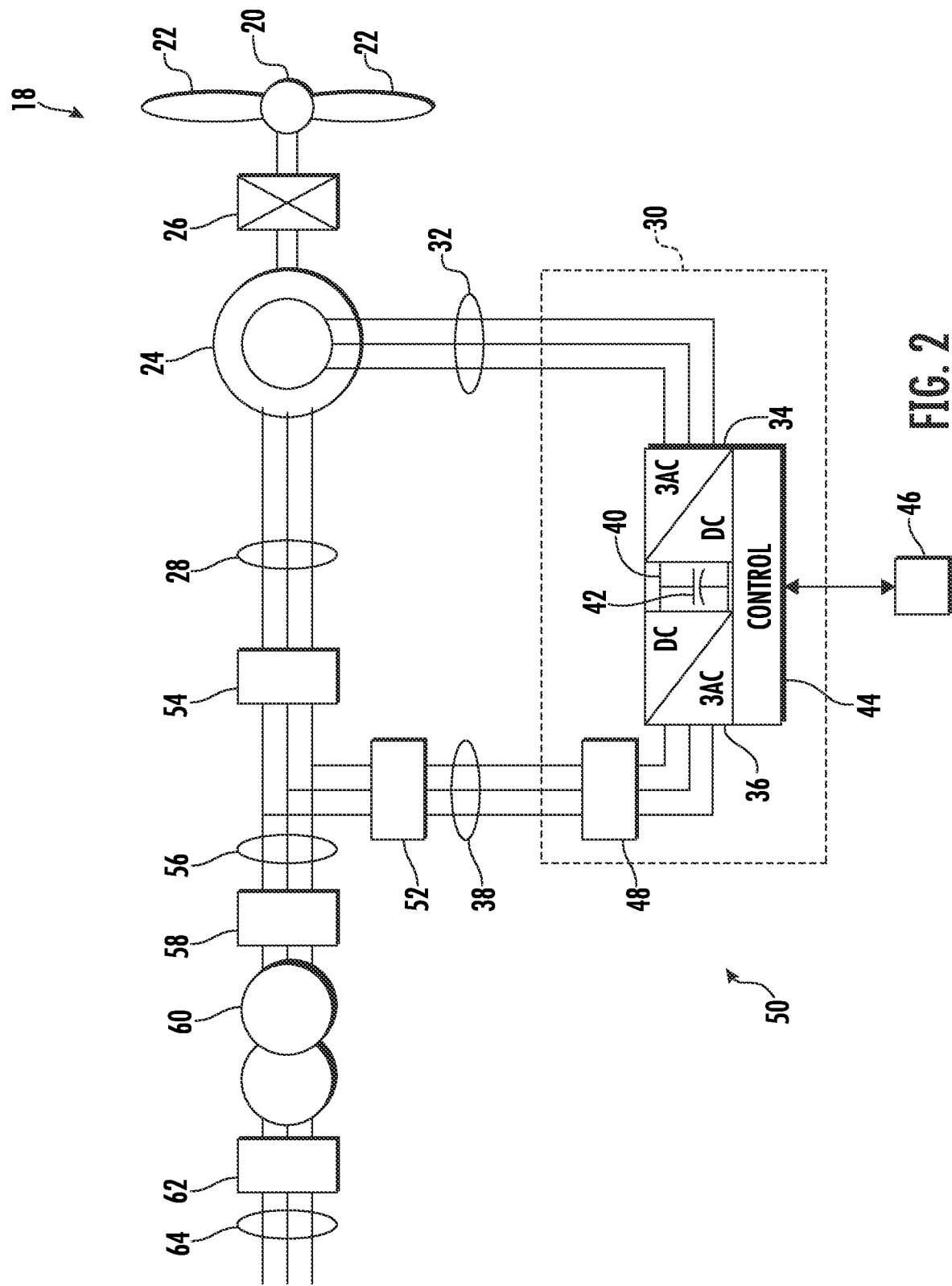
FIG. 2 illustrates a schematic diagram of one embodiment of a DFIG wind turbine system according to the present disclosure.

Referring now to FIG. 2, a schematic diagram of one embodiment of a DFIG wind turbine system 50 is illustrated in accordance with aspects of the present subject matter. It should be appreciated that the present subject matter will generally be described herein with reference to the system 50 shown in FIG. 2. However, those of ordinary skill in the art, using the disclosures provided herein, should understand that aspects of the present disclosure may also be applicable in other power generation systems.

As shown, the rotor 18 of the wind turbine 10 may, optionally, be coupled to a gear box 26, which is, in turn, coupled to the generator 24. In accordance with aspects of the present disclosure, the generator 24 is a doubly-fed induction generator (DFIG). For example, as shown, the DFIG 24 may be coupled to a stator bus 28 and a power converter 30 via a rotor bus 32. The stator bus 28 may provide an output multiphase power (e.g., three-phase power) from a stator of the DFIG 24 and the rotor bus 32 may provide an output multiphase power (e.g., three-phase power) from a rotor of the DFIG 120. As shown in FIG. 2, the power converter 30 includes a rotor side converter 34 and a line side converter 36. The DFIG 24 may be coupled via the rotor bus 32 to the rotor side converter 34. Additionally, the rotor side converter 34 may be coupled to the line side converter 36 which may, in turn, be coupled to a line side bus 38. In particular embodiments, the power converter 30 may be a multi-level bridge power converter, such as a three-level bridge power converter, or higher. As described herein, three-level converters are converters that have three direct current (DC) poles. In addition to positive and negative DC poles, such converters also have a neutral DC pole.

In several embodiments, the rotor side converter 34 and the line side converter 36 may be configured for normal operating mode in a three-phase, pulse width modulation (PWM) arrangement using insulated gate bipolar transistor (IGBT) switching devices. The rotor side converter 34 and the line side converter 36 may be coupled via a DC link 40 across which is a DC link capacitor 42.

In addition, the power converter 30 may be coupled to a controller 44 in order to control the operation of the rotor side converter 34 and the line side converter 36. It should be noted that the controller 44 may, in several embodiments, be configured as an interface between the power converter 30 and a control system 46. The controller 44 may include any number of control devices. In one embodiment, the controller 44 may include a processing device (e.g., microprocessor, microcontroller, etc.) executing computer-readable instructions stored in a computer-readable medium. The instructions when executed by the processing device may cause the processing device to perform operations, including providing control commands to the switching devices and/or the shorting devices of the power converter 30.

In typical configurations, various line contactors and circuit breakers including, for example, a grid breaker 62 may also be included for isolating the various components as necessary for normal operation of the DFIG 24 during connection to and disconnection from the electrical grid 64. For example, a system circuit breaker 58 may couple the system bus 56 to a transformer 60, which may be coupled to the electrical grid 64 via the grid breaker 62. In alternative embodiments, fuses may replace some or all of the circuit breakers.

In operation, alternating current power generated at the DFIG 24 by rotating the rotor 18 is provided via a dual path to the electrical grid 64. The dual paths are defined by the stator bus 28 and the rotor bus 32. On the rotor bus side 256, sinusoidal multi-phase (e.g., three-phase) alternating current (AC) power is provided to the power converter 30. The rotor side converter 34 converts the AC power provided from the rotor bus 32 into direct current (DC) power and provides the DC power to the DC link 40. As is generally understood, switching devices (e.g., IGBTs) used in the bridge circuits of the rotor side converter 34 may be modulated to convert the AC power provided from the rotor bus 32 into DC power suitable for the DC link 40.

In addition, the line side converter 36 converts the DC power on the DC link 126 into AC output power suitable for the electrical grid 124. In particular, switching devices (e.g., IGBTs) used in bridge circuits of the line side power converter 36 can be modulated to convert the DC power on the DC link 40 into AC power on the line side bus 38. The AC power from the power converter 30 can be combined with the power from the stator of DFIG 24 to provide multi-phase power (e.g., three-phase power) having a frequency maintained substantially at the frequency of the electrical grid 64 (e.g., 50 Hz or 60 Hz).

Additionally, various circuit breakers and switches, such as grid breaker 62, system breaker 58, stator sync switch 54, converter breaker 52, and line contactor 48 may be included in the system 50 to connect or disconnect corresponding buses, for example, when current flow is excessive and may damage components of the wind turbine 10 or for other operational considerations. Additional protection components may also be included in the DFIG wind turbine system 50, such as the crowbar circuit described below.

Moreover, the power converter 30 may receive control signals from, for instance, the control system 46 via the controller 44. The control signals may be based, among other things, on sensed conditions or operating characteristics of the DFIG wind turbine system 50. Typically, the control signals provide for control of the operation of the power converter 30. For example, feedback in the form of a sensed speed of the DFIG 24 may be used to control the conversion of the output power from the rotor bus 32 to maintain a proper and balanced multi-phase (e.g., three-phase) power supply. Other feedback from other sensors may also be used by the controller 44 to control the power converter 30, including, for example, stator and rotor bus voltages and current feedbacks. Using the various forms of feedback information, switching control signals (e.g., gate timing commands for IGBTs), shorting control signals, stator synchronizing control signals, and circuit breaker signals may be generated.

Figure 3:
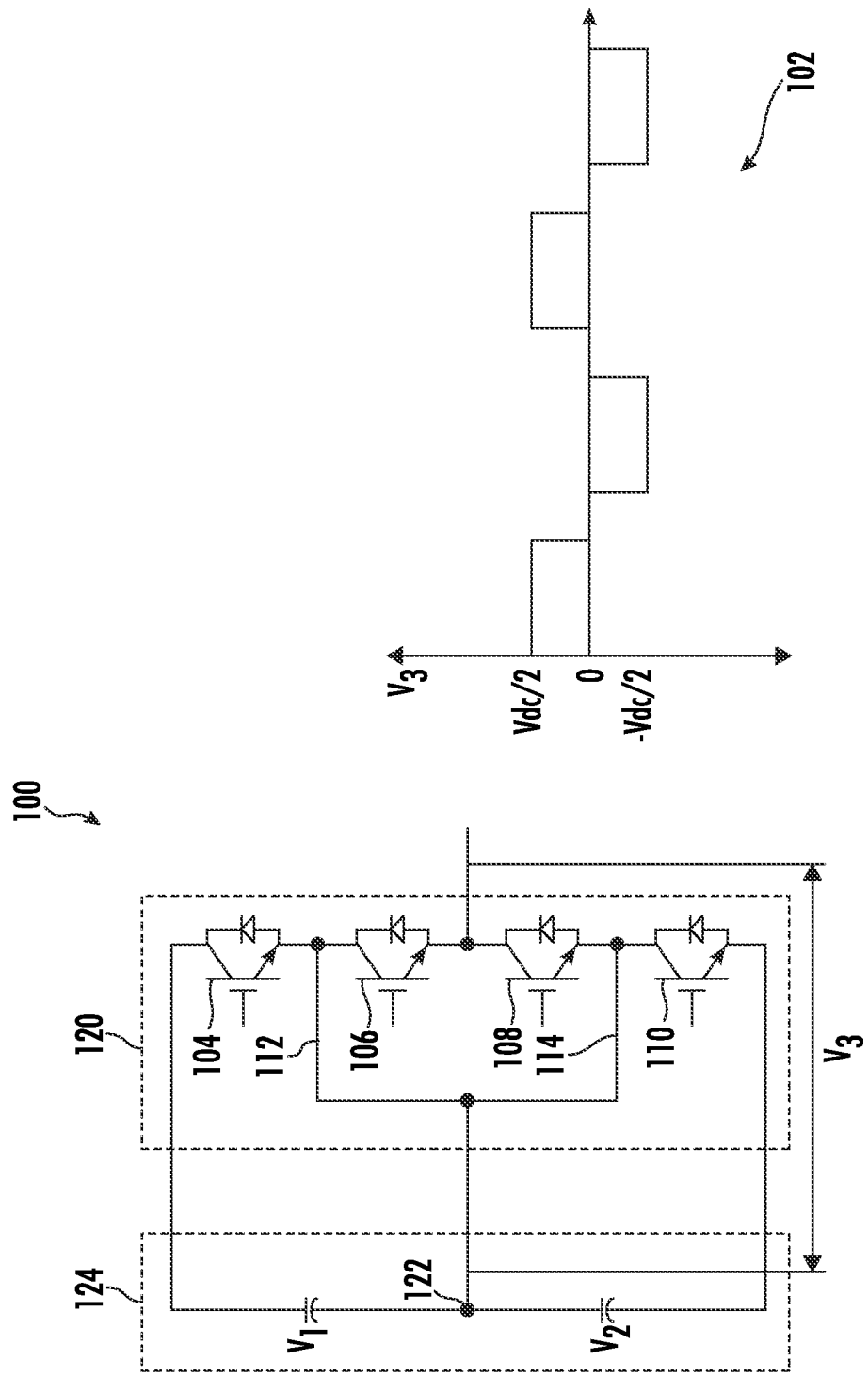
FIG. 3 illustrates a circuit diagram of one leg of a conventional neutral point clamped multi-level converter and its output waveform.

Referring now to FIG. 3, a schematic 100 of one leg 120 or one phase of a conventional neutral point clamped (NPC) or diode clamped three level converter and its output waveform 102 is illustrated. Accordingly, embodiments of the present disclosure enable a multi-level converter to convert DC power into an AC power with a switching device fault detection scheme. For example, in a three level NPC converter, a key failure mode exists when a switching device (such as any of switching elements 104, 106, 108, or 110 of FIG. 3) or a clamping diode (such as diodes 112 and 114 of FIG. 3) fails short. Under this condition, one half of the DC link, V1 or V2 in FIG. 3, is charged to the peak line-to-line voltage of the machine or grid side voltage. This value is typically higher than the maximum allowed blocking voltage of the switching devices and the capacitors. In this case, other switching devices or clamping diodes may be stressed in terms of voltage or current beyond their capability. Hence, this will cause additional switching devices, in particular switching devices in phase legs connected to the same DC bus, to fail after the failure of the initial switching device. The switching device failure detection scheme of the present disclosure provides a suitable logic circuit to detect failures in switching devices and so prevents secondary damage of multi-level converters which may be used in applications such as a solar (or photovoltaic) power generation systems, wind turbine generators or marine and hydrokinetic power generation systems.

Further, as shown, one leg 120 of the three-level converter includes four switching devices 104, 106, 108, 110 and two clamping diodes 112, 114. Input voltages V1 and V2 are controlled to each have a voltage equal to Vdc/2, where Vdc is the total DC link voltage. Voltage V3 is the phase A output voltage measured with respect to a center point 122 of DC link 124. Switching device 104 is complementary to switching device 108 so that, when switching device 104 is gated on, switching device 108 is gated off and vice versa. Similarly, switching devices 106 and 110 are complementary.

In operation, each leg of the NPC three-level converter has three switching stages. In the first switching stage, switching devices 104, 106 are turned on and switching devices 108, 110 are turned off. Assuming a stable operation, V1=V2=Vdc/2, and V3 becomes Vdc/2. In the second switching stage, switching devices 106, 108 are turned on while switching devices 104, 110 are turned off. In this stage, V3 is equal to zero. In the third switching stage, switching devices 104, 106 are turned off whereas switching devices 108, 110 are turned on. This results in V3 becoming −Vdc/2 as shown in waveform 102. Thus, it can be seen that the phase voltage V3 has three levels Vdc/2, −Vdc/2 and 0. When all three legs of the NPC three-phase converter are combined, then the resulting line to line voltages have five levels namely Vdc, Vdc/2, 0, −Vdc/2 and −Vdc. The three-level converter of FIG. 3 may be increased to any level depending on the circuit topology and number of switching devices and diodes in the circuit. As the number of levels in the converter increases, the output waveform of the converter approaches a pure sine wave, resulting in lower harmonics in the output voltage. In general, the number of switching stages can be higher than three as switching devices may not be gated on if the corresponding freewheeling diode is going to conduct current. This operation mode does not affect the number of levels of the output phase voltage.

Figure 4:
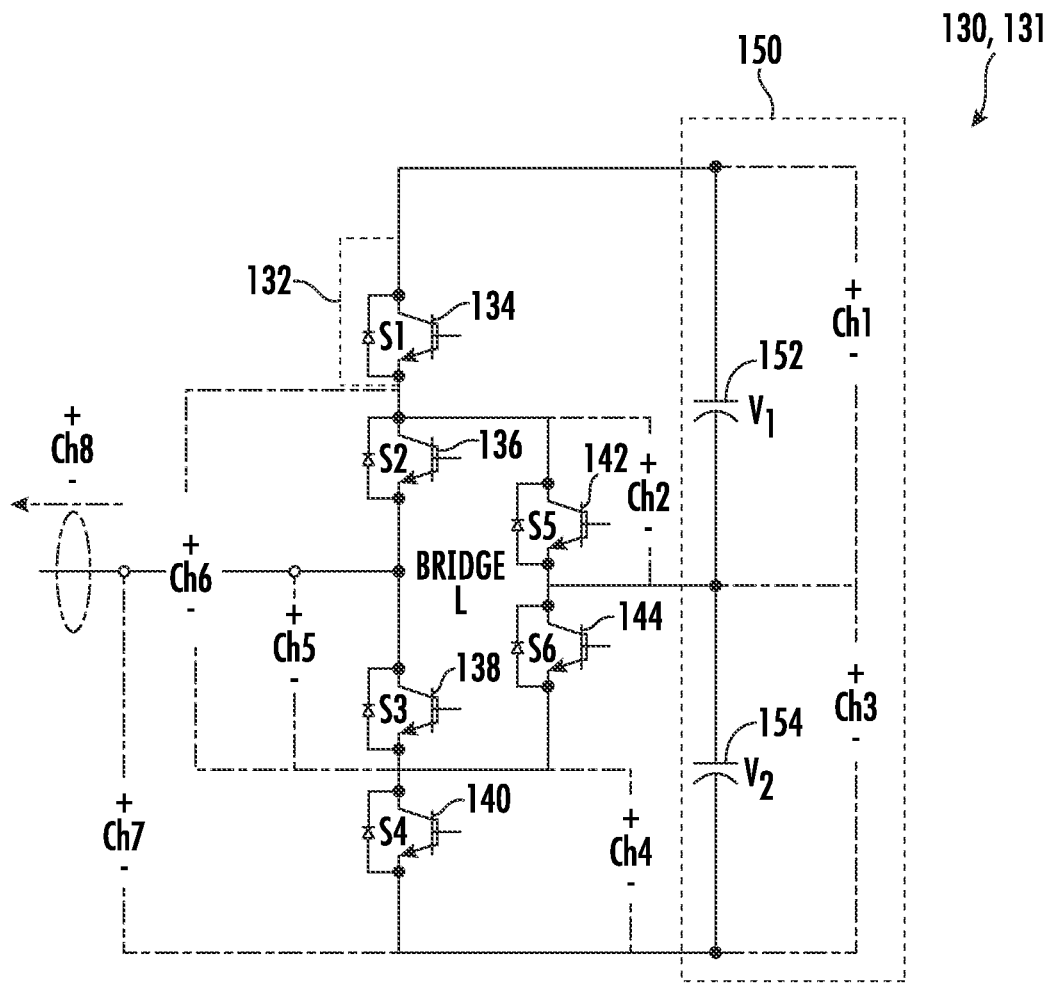
FIG. 4 illustrates a representation of fault condition in a leg of a three phase three level active neutral point clamped (ANPC) converter.

Referring now to FIG. 4, a schematic 130 of an embodiment of one leg 131 or one phase of a three level active neutral point clamped (ANPC) converter is illustrated. In particular, as shown, an embodiment of a fault condition 132 in the leg 131 of the multi-level converter is illustrated. Further, as shown, each leg 131 of the converter includes two outer switching devices (e.g., switching devices 134, 140) and four inner switching devices (e.g., switching devices 136, 138, 142, 144). Thus, as described herein, the two outer switching devices (e.g., switching devices 134, 140) may also be referred to as a first IGBT and a fourth IGBT, whereas the four inner switching devices (e.g., switching devices 136, 138, 142, 144) may also be referred to as a second IGBT, a third IGBT, a fifth IGBT, and a sixth IGBT.

Moreover, as shown, leg 131 is connected to a split DC link 150 with a top capacitor 152 and a bottom capacitor 154. Thus, FIG. 4 shows outer switching device 134 of leg 131 failing short (represented by referral numeral 132). The condition may occur as a result of occurrences such as, for example, thermal breakdown of outer switching device 134, the voltage breakdown of outer switching device 134, failures due to cosmic rays, and failures due to weak manufacturing of the switching device.

Figure 5:
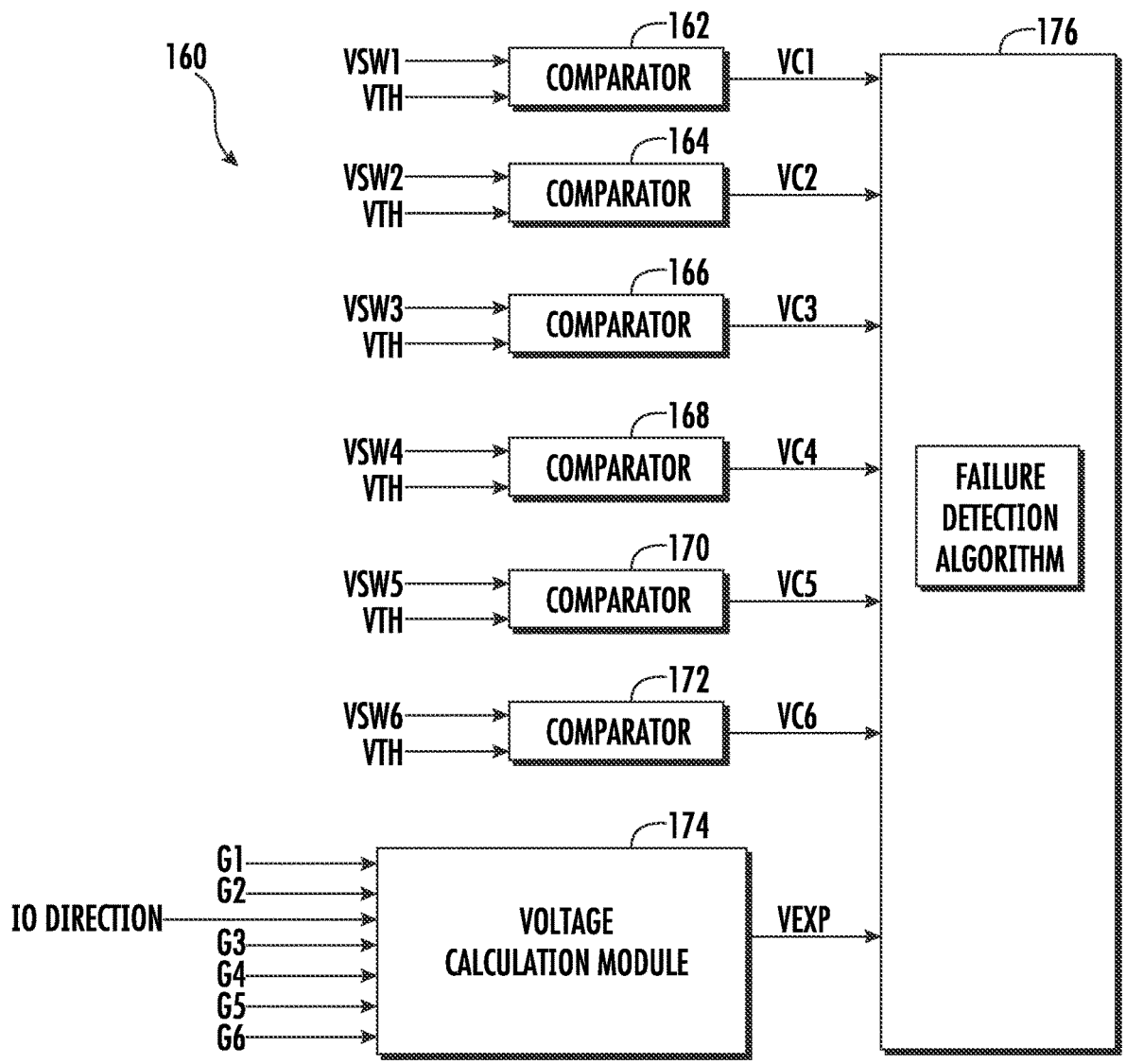
FIG. 5 illustrates a switching device failure detection circuit, in accordance with an embodiment of the present disclosure.

Referring now to FIG. 5, a switching device failure detection circuit 160 in accordance with an embodiment of the present disclosure is illustrated. More particularly, as shown, the switching device failure detection circuit 160 includes logic modules or comparators 162, 164, 166, 168, 170, 172, each corresponding to a respective one of the switching devices 134, 136, 138, 140, 142, 144 (FIG. 4). Switching device failure detection circuit 160 further includes a voltage calculation module 174, and a failure detection algorithm 176. Thus, as shown, each comparator 162, 164, 166, 168, 170, 172 compares two inputs, i) a switching device voltage i.e., a voltage across a switching device Vsw and ii) a threshold reference voltage Vth and provides an output voltage referred as blocking state logic signal Vc. Moreover, the following relationships exist between switching device voltage Vsw (FIG. 5) and channel Ch (FIG. 4, where the channel represents the channel of measurement, such as an oscilloscope):

$Vsw1 = Ch1 - Ch2,$ $Vsw2 = Ch6 - Ch5,$ $Vsw3 = Ch5,$ $Vsw4 = Ch4,$ $Vsw5 = Ch2,$ and $Vsw6 = Ch3 - Ch4,$ Where Ch1 and Ch3 are Vdctop and Vdcbot, Ch7 is measuring pole voltage with DC Neg Ch8 is measuring bridge current (where out of the bridge is positive).

In one embodiment, the threshold reference voltage Vth is set slightly higher than the rated voltage drop across the switching device when the switching device is conducting. In another embodiment, this signal is typically already available from de-saturation detection circuit, e.g., in IGBT converters. In yet another embodiment, the threshold reference voltage Vth may be set to an arbitrary suitable level between the voltage in the previous embodiment i.e., slightly higher than the rated voltage drop across the switching device and below the lower limit of Vdc/2. In another embodiment, the blocking state logic signal Vc is 'high' if Vsw is greater than Vth, else it is 'low'. It should be noted that 'high' refers to the positive supply voltage of the comparator and 'low' refers to the negative supply voltage of the comparator.

Thus, as an example, comparator 162 compares Vsw1 and Vth and outputs Vc1, where Vsw1 refers to voltage across switching device 134, comparator 164 compares voltage across switching device 136, Vsw2 and Vth and outputs Vc2. Similarly, comparator 166 compares Vsw3, which is voltage across switching device 138 and Vth, and outputs Vc3, comparator 168 compares voltage across switching device 140, Vsw4 and Vth and outputs Vc4, comparator 170 compares voltage across switching device 142, Vsw5 and Vth and outputs Vc5, and comparator 172 compares voltage across switching device 144, Vsw6 and Vth and outputs Vc6.

In an embodiment, the comparator(s) 162, 164, 166, 168, 170, 172 may be an open loop operational amplifier circuit or a dedicated voltage comparator integrated within a chip. In another embodiment, a portion of a desaturation circuit generally used in IGBT drivers, which provides a threshold voltage logic signal, may also be used as the comparator(s) 162, 164, 166, 168, 170, 172.

Based on the gate signals of the switching devices 134, 136, 138, 140, 142, 144 and an output current direction (i.e., Io direction), the voltage calculation module 174 determines whether in the current switching stage, each switching device is supposed to block a voltage across its terminals or not. The output of the voltage calculation module 174 is the expected voltage (Vexp) for the switching devices that is input into switching device failure detection algorithm 176. An expected voltage (Vexp) at the output terminal points of leg 131 of the multi-level converter during normal condition is calculated as an intermediate step in voltage calculation module 174.

Figure 7:
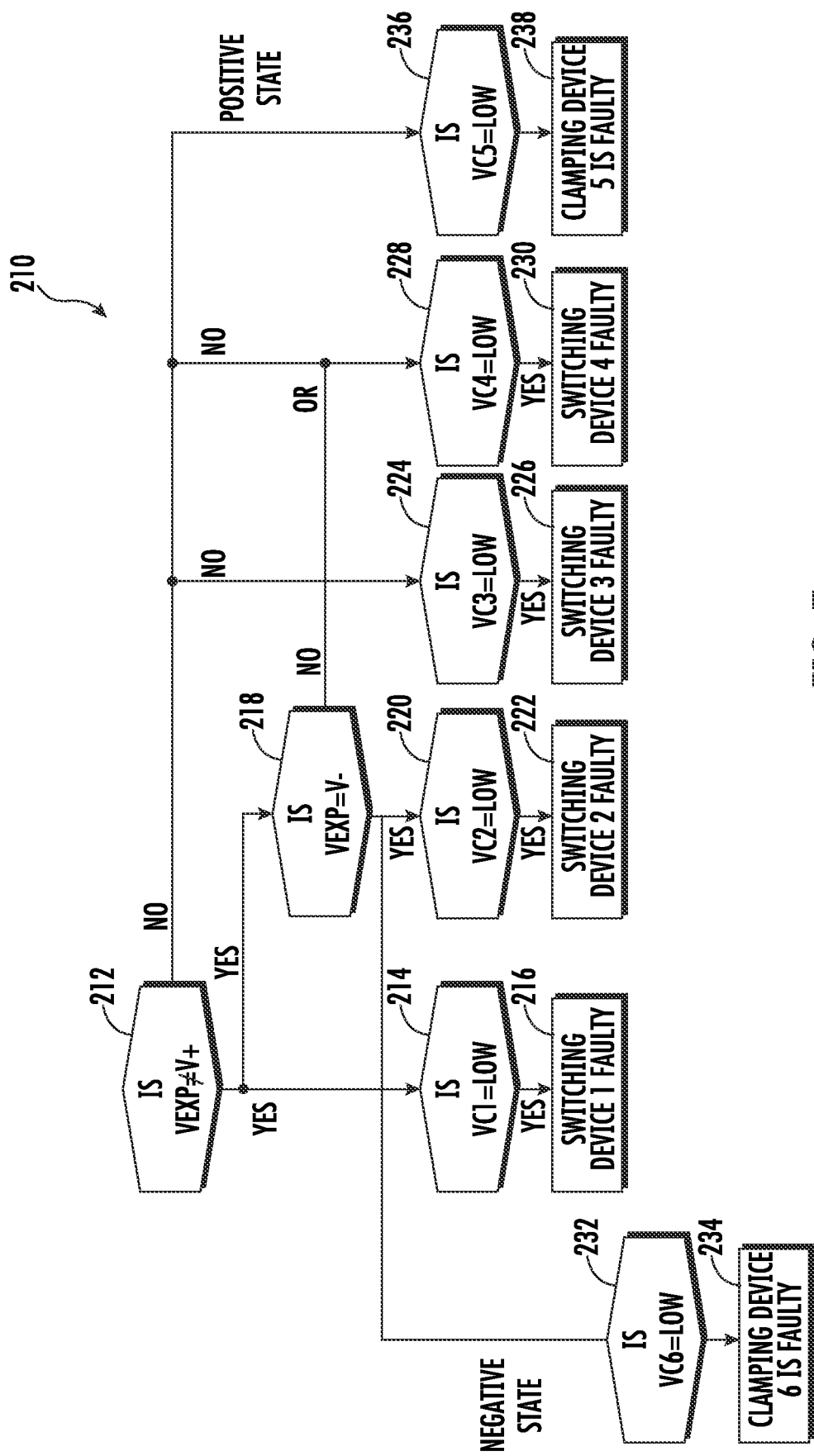
FIG. 7 illustrates a flow diagram of an embodiment of a failure detection algorithm in accordance with an embodiment of the present disclosure.

The expected voltage is determined based on the inputs such as gate drive signals G1, G2, G3, G4, G5, G6 for switching devices 134, 136, 138, 140, 142, 144 and the corresponding output current direction, i.e., Io direction. The expected output voltage Vexp has three levels, positive, negative, and zero. Based on these levels, the gate drive signals, and the output current direction, the determination of whether a particular switching device should block the voltage or not is made and thus, the logic signals Vs1, Vs2, Vs3, Vs4, Vs5, and Vs6 are implicitly generated and used by the failure detection algorithm 176 (as shown in FIG. 7). If any of the logic signals is high, it indicates that the particular switching device should block the voltage, else it should not. Further, the switching device failure detection algorithm 176 can then compare for each switching devices the information whether a switching device is actually blocking or not (i.e., Vc1, Vc2, Vc3, Vc4, Vc5, Vc6) with the information whether each device should be blocking or not (i.e., Vs1, Vs2, Vs3, Vs4, Vs5, and Vs6) in the current switching stage.

If actual blocking state and expected blocking state of any switching device do not match (for example if Vc1≠Vs1), a failure is detected.

The above switching device failure detection circuit 160 may be implemented in the analog domain, or the digital domain, or a combination thereof. Where digital circuitry is used for processing, the circuitry can generally include analog-to-digital conversion, although analog processing components may generally not require such conversion unless some processing is done in the digital domain. Examples of digital circuitry include digital components, such as a programmed microprocessor, field programmable gate array (FPGA), application specific digital signal processor (DSP) or the like. It should be noted that the particular order of processing as represented by the components shown in FIG. 5 may be altered, and other components may be included in the overall circuitry, where desired.

Figure 6:
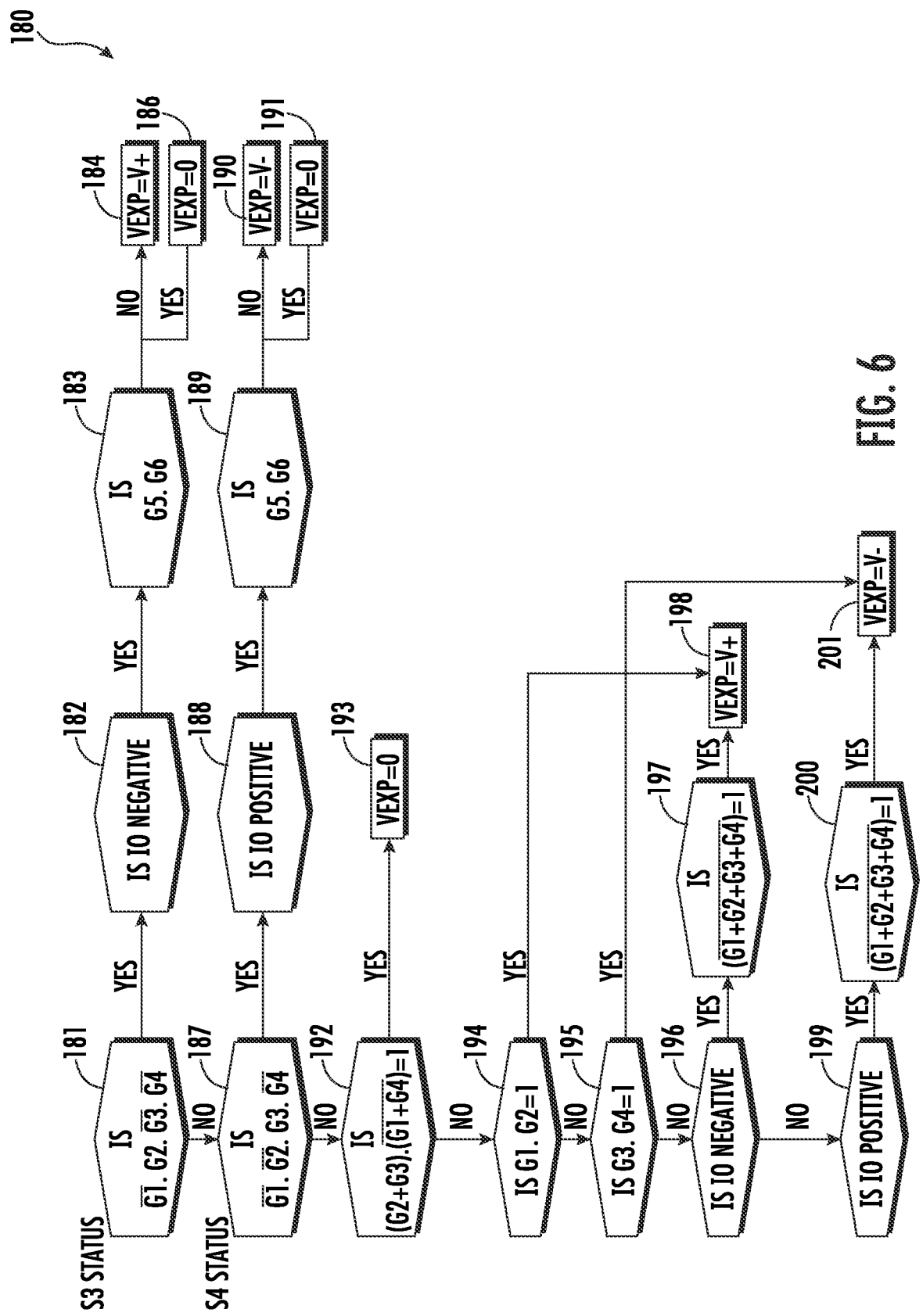
FIG. 6 illustrates a diagrammatical representation of a voltage calculation module, in accordance with an embodiment of the present disclosure.

Referring now to FIG. 6, an embodiment of an implementation of an expected voltage calculation module 180 for determining the expected voltage Vexp at the multi-level converter terminals is illustrated. In particular, as shown, the voltage calculation module 180 receives inputs such as gate drive signals G1, G2, G3, G4, G5, G6 for switching devices 134, 136, 138, 140, 142, 144, respectively, and also output current or Io direction. It should be noted the gate drive signal levels determine whether any switching device is ON or not. For example, if G2 or G3 is high, switching devices 136 and 138 are ON, respectively. Thus, for all the cases presented below, if the switching device is ON, the corresponding gate drive signal is referred to as high.

As shown at 181, 182, 183, and 186, if the gate drive signals (i.e., G1, G2, and G4) for the first IGBT, the third IGBT, and the fourth IGBT are low, the gate drive signal (G2) for the second IGBT is high, the output current direction is negative, and the gate signals (i.e., G5, G6) of the fifth IGBT and the sixth IGBT are high, then as shown at 186, the expected output voltage is a zero voltage.

In an alternative path, as shown at 181, 182, 183, and 184 if the gate drive signals (i.e., G1, G3, and G4) for the first IGBT, the third IGBT, and the fourth IGBT are low, the gate drive signal (G2) of the second IGBT is high, the output current direction is negative, and the gate drivel signals (i.e., G5, G6) for the fifth IGBT or the sixth IGBT are low, then as shown at 184, the expected output voltage is a positive voltage.

As shown at 187, 188, 189, and 191, if the gate drive signals (i.e., G1, G2, and G4) for the first IGBT, the second IGBT, and the fourth IGBT are low, the gate drive signal (G3) of the third IGBT is high, the output current direction is positive, and the gate signals (i.e., G5, G6) of the fifth IGBT and the sixth IGBT are high, then as shown at 191, the expected output voltage is a zero voltage.

In an alternative path, as shown at 187, 188, 189, and 190, if the gate drive signals (i.e., G1, G2, and G4) for the first IGBT, the second IGBT, and the fourth IGBT are low, the gate drive signal (G3) of the third IGBT is high, the output current direction is positive, and the gate drivel signals (i.e., G5, G6) for the fifth IGBT or the sixth IGBT are low, then as shown at 190, the expected output voltage is a negative voltage.

Still referring to FIG. 6, as shown at 192, it can be further determined whether any one of inner switching devices 136, 138 (e.g., second IGBT or third IGBT) are ON and whether both outer switching devices 134, 140 (e.g., first IGBT or fourth IGBT) are OFF. In such a situation, the expected voltage Vexp is equivalent to a zero voltage as represented by a block 193. This condition is represented in step 192 by a Boolean equation, (G2+G3).(G1+G4)=1, in which the period (.) is used to represent multiplication (logic-AND).

However, if this condition is not met, then as shown at 194, it is determined whether both top switching devices 134, 136 (e.g., first IGBT and second IGBT) are ON i.e., whether G1.G2=1. If both top switching devices 134, 136 are ON, then the expected voltage Vexp at the output terminals should be a positive voltage i.e., V+, represented by a block 198. If the condition checked at 194 is not met, then as shown at 195, the algorithm 180 determines whether both bottom switching devices 138, 140 (e.g., third IGBT and fourth IGBT) are ON i.e., represented by G3.G4=1. Both bottom switching devices 138, 140 being ON indicates that expected voltage Vexp should be a negative voltage i.e., V− represented by a block 201. If any of the conditions 192, 194, 195 are not met, then the output current (Io) direction helps in determining the expected voltage Vexp, as shown at 196 and 199.

In particular, as shown at 196, it is determined whether the output current Io is negative or not. If output current Io is negative, then as shown at 200, the algorithm 190 determines whether the switching devices 134, 136, 138, 140 (e.g., first IGBT, second IGBT, third IGBT, and fourth IGBT) are OFF. This condition is represented as shown at 197 by a Boolean equation, NOT(G1+G2+G3+G4)=1, wherein the plus sign (+) is used to represent addition (logic-OR). If these switching devices are OFF and the output current Io is negative, it indicates that freewheeling diodes of the top two switching devices are conducting. Thus, the expected voltage Vexp during this condition will be positive voltage V+, as represented by block 198. If it is determined at 196, that output current Io is not negative (i.e., positive or zero), then as shown at 199, it is determined whether the output current Io is positive or not. If the output current Io is positive, as shown at 200, it is again determined whether the switching devices 134, 136, 138, 140 are OFF. If the switching devices 134, 136, 138, 140 are OFF and the current direction is positive, it indicates that freewheeling diodes of the bottom two switching devices (e.g., third IGBT or fourth IGBT) are conducting and the expected voltage during this condition will be negative voltage V− (as shown at 201).

Referring now to FIG. 7, a failure detection algorithm 210 in accordance with an embodiment of the present disclosure is illustrated. In particular, as shown, the failure detection algorithm 210 determines whether any switching device that should block a DC voltage is actually not blocking DC voltage. In particular, as shown at 212, it is determined whether expected voltage Vexp is positive (V+) or not. If Vexp is not equal to V+, i.e., if Vexp is equal to negative voltage V− or zero voltage, then as shown at 214, it is checked whether blocking state logic signal Vc1 of first switching device 134 is low or high. If Vc1 is low then it indicates that switching device 134 is not blocking any voltage when actually it should block the voltage. The fault indication or the short circuit indication is then provided as shown in block 216. Another condition that is checked if Vexp is not equal to V+ is whether Vexp is negative voltage i.e., V−. If it is determined at 218 that Vexp is indeed V−, then as shown at 220, it is checked whether blocking state logic signal Vc2 for switching device 136 is low. If Vc2 is low, then the second switching device 136 is considered to be faulty as shown in block 222. If it is determined that Vexp is a positive voltage i.e., V+, then as shown at 224, the blocking state logic signal Vc3 for switching device 138 is compared with the low voltage. If it is found that Vc3 is low, then it means the switching device 138 is faulty as shown in block 226.

Further, if the expected voltage Vexp is zero as determined at 218 or positive as determined at 212, then as shown at 228, it is checked whether the blocking state logic signal Vc4 for the switching device 138 is low. If Vc4 is low, then it is indication of the switching device 140 being faulty as shown in block 230. Moreover, if it is determined that Vexp is a positive voltage i.e., V+, then as shown at 236, the blocking state logic signal Vc5 for switching device 142 is compared with the low voltage. If it is found that Vc5 is low, then it means the switching device 142 is faulty as shown in block 238. Further, if it is determined that Vexp is a negative voltage i.e., V−, then as shown at 232, the blocking state logic signal Vc6 for switching device 144 is compared with the low voltage. If it is found that Vc6 is low, then it means the switching device 144 is faulty as shown in block 234. Thus, in this way with various combinations, failure conditions of switching devices are determined.

It should be noted that the steps presented in FIGS. 6 and 7 are not restricted by their sequence. For instance, in an embodiment, some of the steps can be performed in parallel or in another embodiment; the sequence of the steps can be interchanged as long as it does not affect the final outcome.

Figure 8:
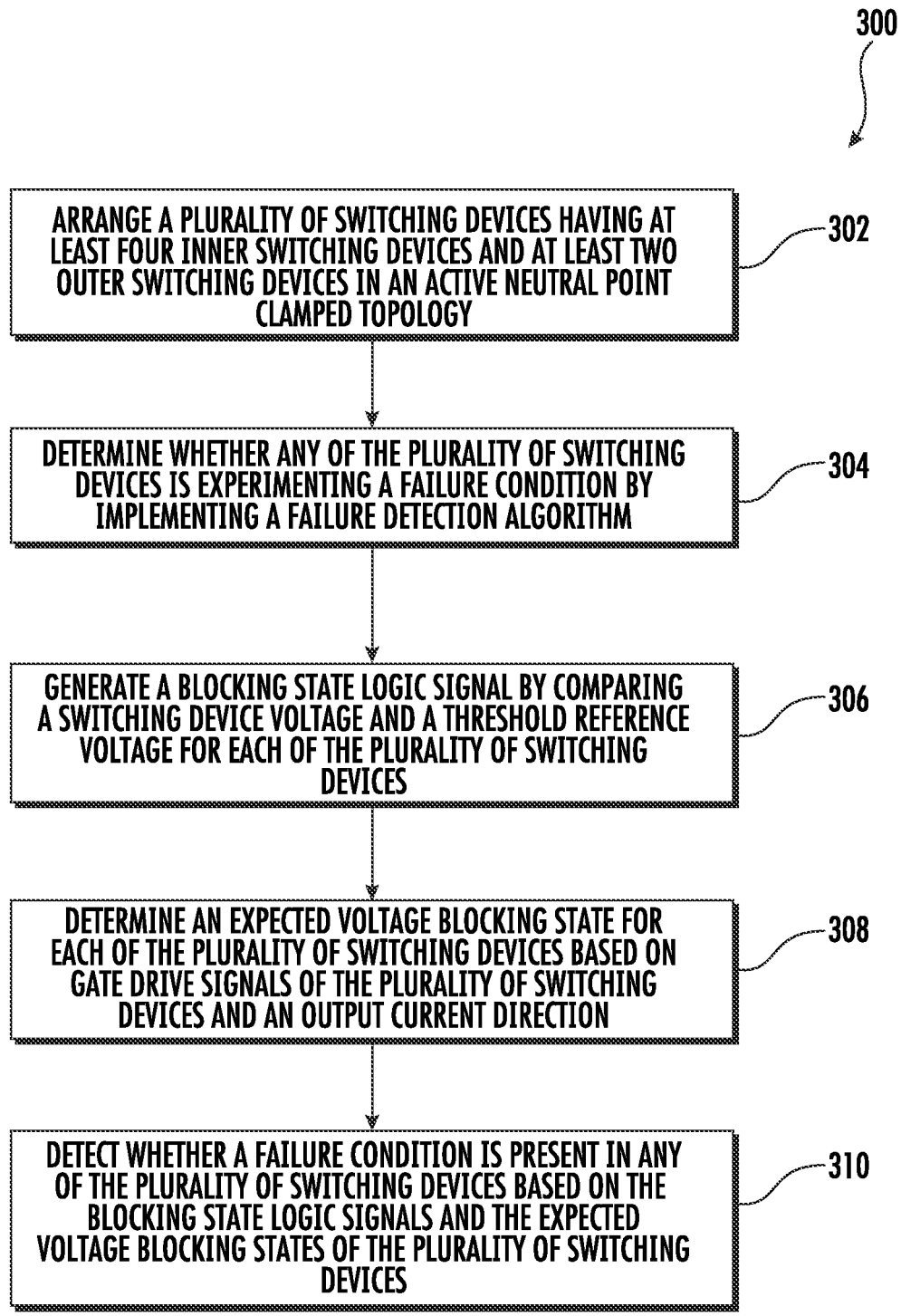
FIG. 8 illustrates a flow diagram of an embodiment of a method for operating a multi-level bridge power converter of an electrical power system connected to a power grid according to the present disclosure.

Referring now to FIG. 8, a flow diagram of one embodiment of a computer-implemented method 300 for operating a multi-level bridge power converter of an electrical power system connected to a power grid is illustrated in accordance with aspects of the present subject matter. In general, the method 300 will be described herein as being implemented using a wind turbine system, such as the DFIG wind turbine system 50 described above with reference to FIGS. 1-7. However, it should be appreciated that the disclosed method 300 may be implemented using any other suitable power generation system that is configured to supply power for application to a load. In addition, although FIG. 8 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (302), the method 300 includes arranging a plurality of switching devices having at least four inner switching devices and at least two outer switching devices in an active neutral point clamped topology. As shown at (304), the method 300 includes determining whether any of the plurality of switching devices is experiencing a failure condition by implementing a failure detection algorithm. As shown at (306), the failure detection algorithm includes generating a blocking state logic signal by comparing a switching device voltage and a threshold reference voltage for each of the plurality of switching devices. As shown at (308), the failure detection algorithm includes determining an expected voltage blocking state for each of the plurality of switching devices based on gate drive signals of the plurality of switching devices and an output current direction. As shown at (310), the failure detection algorithm includes detecting whether a failure condition is present in any of the plurality of switching devices based on the blocking state logic signals and the expected voltage blocking states of the plurality of switching devices.

Further aspects of the disclosure are provided by the subject matter of the following clauses:

Clause 1. A computer-implemented method for operating a multi-level bridge power converter of an electrical power system connected to a power grid, the power converter comprising a first converter and a second converter coupled via a DC link, the method comprising:

arranging a plurality of switching devices having at least four inner switching devices and at least two outer switching devices in an active neutral point clamped topology;

determining whether any of the plurality of switching devices is experiencing a failure condition by implementing a failure detection algorithm, the failure detection algorithm comprising:

generating a blocking state logic signal by comparing a switching device voltage and a threshold reference voltage for each of the plurality of switching devices;

determining an expected voltage blocking state for each of the plurality of switching devices based on gate drive signals of the plurality of switching devices and an output current direction; and detecting whether a failure condition is present in any of the plurality of switching devices based on the blocking state logic signals and the expected voltage blocking states of the plurality of switching devices.

Clause 2. The method of clause 1, wherein the plurality of switching devices comprises, at least, a plurality of insulated gate bipolar transistors (IGBTs), the plurality of IGBTs comprising a first IGBT, a second IGBT, a third IGBT, a fourth IGBT, a fifth IGBT, and a sixth IGBT, and wherein the second IGBT, the third IGBT, the fifth IGBT, and the sixth IGBT are the four inner switching devices, and the first IGBT and the fourth IGBT are the two outer switching devices.

Clause 3. The method of clause 2, wherein determining the expected voltage blocking state for each of the plurality of switching devices based on the gate drive signals of the plurality of switching devices and the output current direction further comprises determining the expected output voltage at output terminals of the multi-level bridge power converter.

Clause 4. The method of clause 3, wherein the expected output voltage is a zero voltage when the gate drive signals for the first IGBT, the third IGBT, and the fourth IGBT are low, the gate drive signal of the second IGBT is high, the output current direction is negative, and the gate drive signals for the fifth IGBT and the sixth IGBT are high or when the gate drive signals for the first IGBT, the second IGBT, and the fourth IGBT are low, the gate drive signal of the third IGBT is high, the output current direction is positive, and the gate drive signals for the fifth IGBT and the sixth IGBT are high or when the gate drive signals for the second IGBT or the third IGBT are high and the gate drive signals for both the first IGBT and the fourth IGBT are low.

Clause 5. The method of clauses 3-4, wherein the expected output voltage is a positive voltage when the gate drive signals for the first IGBT, the third IGBT, and the fourth IGBT are low, the gate drive signal of the second IGBT is high, the output current direction is negative, and the gate drive signals for the fifth IGBT or the sixth IGBT are low or when the gate drive signals for both the first IGBT and the second IGBT are high or when the output current direction is negative and the gate drive signals for the first IGBT, the second IGBT, the third IGBT, and the fourth IGBT are low.

Clause 6. The method of clauses 3-5, wherein the expected output voltage is a negative voltage when the gate drive signals for the first IGBT, the second IGBT, and the fourth IGBT are low, the gate drive signal of the third IGBT is high, the output current direction is positive, and the gate drive signals for the fifth IGBT or the sixth IGBT are low or when the gate drive signals for both the third IGBT and the fourth IGBT are high or when the output current direction is positive and the gate drive signals for the first IGBT, the second IGBT, the third IGBT, and the fourth IGBT are low.

Clause 7. The method of clauses 3-6, wherein the failure detection algorithm detects the failure condition in the first IGBT when the expected output voltage is not positive and the blocking state logic signal for the first IGBT is low.

Clause 8. The method of clauses 3-7, wherein the failure detection algorithm detects the failure condition in the second IGBT when the expected output voltage is negative and the blocking state logic signal for the second IGBT is low.

Clause 9. The method of clauses 3-8, wherein the failure detection algorithm detects the failure condition in the third IGBT when the expected output voltage is positive and the blocking state logic signal for the third IGBT is low.

Clause 10. The method of clauses 3-9, wherein the failure detection algorithm detects the failure condition in the fourth IGBT when the expected output voltage is positive or zero and the blocking state logic signal for the fourth IGBT is low.

Clause 11. The method of clauses 3-10, wherein the failure detection algorithm detects the failure condition in the fifth IGBT when the expected output voltage is positive and the blocking state logic signal for the fifth IGBT is low.

Clause 12. The method of clauses 3-11, wherein the failure detection algorithm detects the failure condition in the sixth IGBT when the expected output voltage is negative and the blocking state logic signal for the sixth IGBT is low.

Clause 13. A multi-level bridge power converter, comprising:

a plurality of phase legs each comprising a plurality of switching devices, the plurality of switching devices comprising at least four inner switching devices and at least two outer switching devices arranged in an active neutral point clamped topology; and a switching device failure detection circuit, comprising:
a logic module for each of the plurality of switching devices to generate a blocking state logic signal by comparing a switching device voltage of each of the plurality of switching devices and a threshold reference voltage;
a voltage calculation module to determine an expected voltage blocking state for each of the plurality of switching devices based on gate drive signals of the plurality of switching devices and an output current direction; and
a failure detection algorithm to detect a failure condition in any of the plurality of switching devices based on the blocking state logic signals and the expected voltage blocking states of the plurality of switching devices.

Clause 14. The multi-level bridge power converter of clause 13, wherein the plurality of switching devices comprises, at least, a plurality of insulated gate bipolar transistors (IGBTs), the plurality of IGBTs comprising a first IGBT, a second IGBT, a third IGBT, a fourth IGBT, a fifth IGBT, and a sixth IGBT, and wherein the second IGBT, the third IGBT, the fifth IGBT, and the sixth IGBT are the four inner switching devices, and the first IGBT and the fourth IGBT are the two outer switching devices.

Clause 15. The multi-level bridge power converter of clause 14, wherein determining the expected voltage blocking state for each of the plurality of switching devices based on the gate drive signals of the plurality of switching devices and the output current direction further comprises determining the expected output voltage at output terminals of the multi-level bridge power converter.

Clause 16. The multi-level bridge power converter of clause 15, wherein the expected output voltage is a zero voltage when the gate drive signals for the first IGBT, the third IGBT, and the fourth IGBT are low, the gate drive signal of the second IGBT is high, the output current direction is negative, and the gate drive signals for the fifth IGBT and the sixth IGBT are high or when the gate drive signals for the first IGBT, the second IGBT, and the fourth IGBT are low, the gate drive signal of the third IGBT is high, the output current direction is positive, and the gate drive signals for the fifth IGBT and the sixth IGBT are high or when the gate drive signals for the second IGBT or the third IGBT are high and the gate drive signals for both the first IGBT and the fourth IGBT are low.

Clause 17. The multi-level bridge power converter of clauses 15-16, wherein the expected output voltage is a positive voltage when the gate drive signals for the first IGBT, the third IGBT, and the fourth IGBT are low, the gate drive signal of the second IGBT is high, the output current direction is negative, and the gate drive signals for the fifth IGBT or the sixth IGBT are low or when the gate drive signals for both the first IGBT and the second IGBT are high or when the output current direction is negative and the gate drive signals for the first IGBT, the second IGBT, the third IGBT, and the fourth IGBT are low.

Clause 18. The multi-level bridge power converter of clauses 15-17, wherein the expected output voltage is a negative voltage when the gate drive signals for the first IGBT, the second IGBT, and the fourth IGBT are low, the gate drive signal of the third IGBT is high, the output current direction is positive, and the gate drive signals for the fifth IGBT or the sixth IGBT are low or when the gate drive signals for both the third IGBT and the fourth IGBT are high or when the output current direction is positive and the gate drive signals for the first IGBT, the second IGBT, the third IGBT, and the fourth IGBT are low.

Clause 19. The multi-level bridge power converter of clauses 15-18, wherein the failure detection algorithm detects the failure condition in the first IGBT when the expected output voltage is not positive and the blocking state logic signal for the first IGBT is low, wherein the failure detection algorithm detects the failure condition in the second IGBT when the expected output voltage is negative and the blocking state logic signal for the second IGBT is low, wherein the failure detection algorithm detects the failure condition in the third IGBT when the expected output voltage is positive and the blocking state logic signal for the third IGBT is low, and wherein the failure detection algorithm detects the failure condition in the fourth IGBT when the expected output voltage is positive or zero and the blocking state logic signal for the fourth IGBT is low.

Clause 20. The multi-level bridge power converter of clauses 15-19, wherein the failure detection algorithm detects the failure condition in the fifth IGBT when the expected output voltage is positive and the blocking state logic signal for the fifth IGBT is low, and wherein the failure detection algorithm detects the failure condition in the sixth IGBT when the expected output voltage is negative and the blocking state logic signal for the sixth IGBT is low.

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method for operating a multi-level bridge power converter of an electrical power system connected to a power grid, the power converter comprising a first converter and a second converter coupled via a DC link, the method comprising:
    arranging a plurality of switching devices having at least four inner switching devices and at least two outer switching devices in an active neutral point clamped topology, wherein the plurality of switching devices comprises, at least, a plurality of insulated gate bipolar transistors (IGBTs), the plurality of IGBTs comprising a first IGBT, a second IGBT, a third IGBT, a fourth IGBT, a fifth IGBT, and a sixth IGBT, and wherein the second IGBT, the third IGBT, the fifth IGBT, and the sixth IGBT are the at least four inner switching devices, and the first IGBT and the fourth IGBT are the at least two outer switching devices;
    determining whether any of the plurality of switching devices is experiencing a failure condition by implementing a failure detection algorithm, the failure detection algorithm comprising:
        generating a blocking state logic signal by comparing a switching device voltage and a threshold reference voltage for each of the plurality of switching devices;
        determining an expected voltage blocking state for each of the plurality of switching devices based on gate drive signals of the plurality of switching devices and an output current direction; and
        detecting whether a failure condition is present in any of the plurality of switching devices based on the blocking state logic signals and the expected voltage blocking states of the plurality of switching devices,
        wherein the failure detection algorithm detects the failure condition in the first IGBT when an expected output voltage is not positive and the blocking state logic signal for the first IGBT is low.

2. The method of claim 1, wherein determining the expected voltage blocking state for each of the plurality of switching devices based on the gate drive signals of the plurality of switching devices and the output current direction further comprises determining the expected output voltage at output terminals of the multi-level bridge power converter.

3. The method of claim 2, wherein the expected output voltage is a zero voltage when the gate drive signals for the first IGBT, the third IGBT, and the fourth IGBT are low, the gate drive signal of the second IGBT is high, the output current direction is negative, and the gate drive signals for the fifth IGBT and the sixth IGBT are high or when the gate drive signals for the first IGBT, the second IGBT, and the fourth IGBT are low, the gate drive signal of the third IGBT is high, the output current direction is positive, and the gate drive signals for the fifth IGBT and the sixth IGBT are high or when the gate drive signals for the second IGBT or the third IGBT are high and the gate drive signals for both the first IGBT and the fourth IGBT are low.

4. The method of claim 2, wherein the expected output voltage is a positive voltage when the gate drive signals for the first IGBT, the third IGBT, and the fourth IGBT are low, the gate drive signal of the second IGBT is high, the output current direction is negative, and the gate drive signals for the fifth IGBT or the sixth IGBT are low or when the gate drive signals for both the first IGBT and the second IGBT are high or when the output current direction is negative and the gate drive signals for the first IGBT, the second IGBT, the third IGBT, and the fourth IGBT are low.

5. The method of claim 2, wherein the expected output voltage is a negative voltage when the gate drive signals for the first IGBT, the second IGBT, and the fourth IGBT are low, the gate drive signal of the third IGBT is high, the output current direction is positive, and the gate drive signals for the fifth IGBT or the sixth IGBT are low or when the gate drive signals for both the third IGBT and the fourth IGBT are high or when the output current direction is positive and the gate drive signals for the first IGBT, the second IGBT, the third IGBT, and the fourth IGBT are low.

6. The method of claim 2, wherein the failure detection algorithm detects the failure condition in the second IGBT when the expected output voltage is negative and the blocking state logic signal for the second IGBT is low.

7. The method of claim 2, wherein the failure detection algorithm detects the failure condition in the third IGBT when the expected output voltage is positive and the blocking state logic signal for the third IGBT is low.

8. The method of claim 2, wherein the failure detection algorithm detects the failure condition in the fourth IGBT when the expected output voltage is positive or zero and the blocking state logic signal for the fourth IGBT is low.

9. The method of claim 2, wherein the failure detection algorithm detects the failure condition in the fifth IGBT when the expected output voltage is positive and the blocking state logic signal for the fifth IGBT is low.

10. The method of claim 2, wherein the failure detection algorithm detects the failure condition in the sixth IGBT when the expected output voltage is negative and the blocking state logic signal for the sixth IGBT is low.

11. A multi-level bridge power converter, comprising:
a plurality of phase legs each comprising a plurality of switching devices, the plurality of switching devices comprising at least four inner switching devices and at least two outer switching devices arranged in an active neutral point clamped topology, wherein the plurality of switching devices comprises, at least, a plurality of insulated gate bipolar transistors (IGBTs), the plurality of IGBTs comprising a first IGBT, a second IGBT, a third IGBT, a fourth IGBT, a fifth IGBT, and a sixth IGBT, and wherein the second IGBT, the third IGBT, the fifth IGBT, and the sixth IGBT are the four inner switching devices, and the first IGBT and the fourth IGBT are the two outer switching devices; and
a switching device failure detection circuit, comprising:
a logic module for each of the plurality of switching devices to generate a blocking state logic signal by comparing a switching device voltage of each of the plurality of switching devices and a threshold reference voltage;
a voltage calculation module to determine an expected voltage blocking state for each of the plurality of switching devices based on gate drive signals of the plurality of switching devices and an output current direction; and
a failure detection algorithm to detect a failure condition in any of the plurality of switching devices based on the blocking state logic signals and the expected voltage blocking states of the plurality of switching devices, wherein the failure detection algorithm detects the failure condition in the first IGBT when an expected output voltage is not positive and the blocking state logic signal for the first IGBT is low.

12. The multi-level bridge power converter of claim 11, wherein determining the expected voltage blocking state for each of the plurality of switching devices based on the gate drive signals of the plurality of switching devices and the output current direction further comprises determining the expected output voltage at output terminals of the multi-level bridge power converter.

13. The multi-level bridge power converter of claim 12, wherein the expected output voltage is a zero voltage when the gate drive signals for the first IGBT, the third IGBT, and the fourth IGBT are low, the gate drive signal of the second IGBT is high, the output current direction is negative, and the gate drive signals for the fifth IGBT and the sixth IGBT are high or when the gate drive signals for the first IGBT, the second IGBT, and the fourth IGBT are low, the gate drive signal of the third IGBT is high, the output current direction is positive, and the gate drive signals for the fifth IGBT and the sixth IGBT are high or when the gate drive signals for the second IGBT or the third IGBT are high and the gate drive signals for both the first IGBT and the fourth IGBT are low.

14. The multi-level bridge power converter of claim 12, wherein the expected output voltage is a positive voltage when the gate drive signals for the first IGBT, the third IGBT, and the fourth IGBT are low, the gate drive signal of the second IGBT is high, the output current direction is negative, and the gate drive signals for the fifth IGBT or the sixth IGBT are low or when the gate drive signals for both the first IGBT and the second IGBT are high or when the output current direction is negative and the gate drive signals for the first IGBT, the second IGBT, the third IGBT, and the fourth IGBT are low.

15. The multi-level bridge power converter of claim 12, wherein the expected output voltage is a negative voltage when the gate drive signals for the first IGBT, the second IGBT, and the fourth IGBT are low, the gate drive signal of the third IGBT is high, the output current direction is positive, and the gate drive signals for the fifth IGBT or the sixth IGBT are low or when the gate drive signals for both the third IGBT and the fourth IGBT are high or when the output current direction is positive and the gate drive signals for the first IGBT, the second IGBT, the third IGBT, and the fourth IGBT are low.

16. The multi-level bridge power converter of claim 12, wherein the failure detection algorithm detects the failure condition in the first IGBT when the expected output voltage is not positive and the blocking state logic signal for the first IGBT is low, wherein the failure detection algorithm detects the failure condition in the second IGBT when the expected output voltage is negative and the blocking state logic signal for the second IGBT is low, wherein the failure detection algorithm detects the failure condition in the third IGBT when the expected output voltage is positive and the blocking state logic signal for the third IGBT is low, and wherein the failure detection algorithm detects the failure condition in the fourth IGBT when the expected output voltage is positive or zero and the blocking state logic signal for the fourth IGBT is low.

17. The multi-level bridge power converter of claim 12, wherein the failure detection algorithm detects the failure condition in the fifth IGBT when the expected output voltage is positive and the blocking state logic signal for the fifth IGBT is low, and wherein the failure detection algorithm detects the failure condition in the sixth IGBT when the expected output voltage is negative and the blocking state logic signal for the sixth IGBT is low.

\* \* \* \* \*